E. C. RICHARD.
INTERNAL COMBUSTION ENGINE.
APPLICATION FILED JAN. 13, 1908.

954,208.

Patented Apr. 5, 1910.
5 SHEETS—SHEET 1.

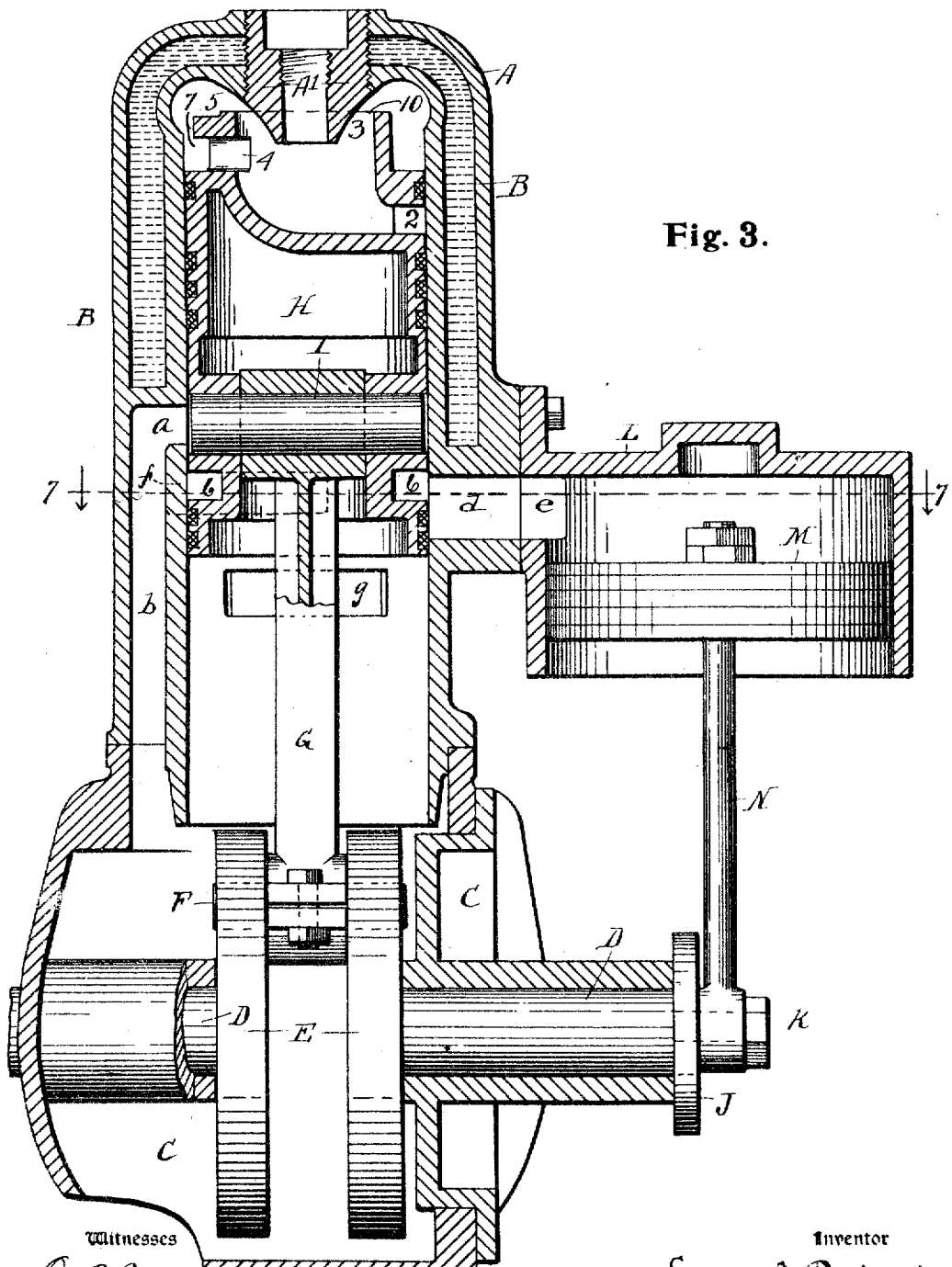

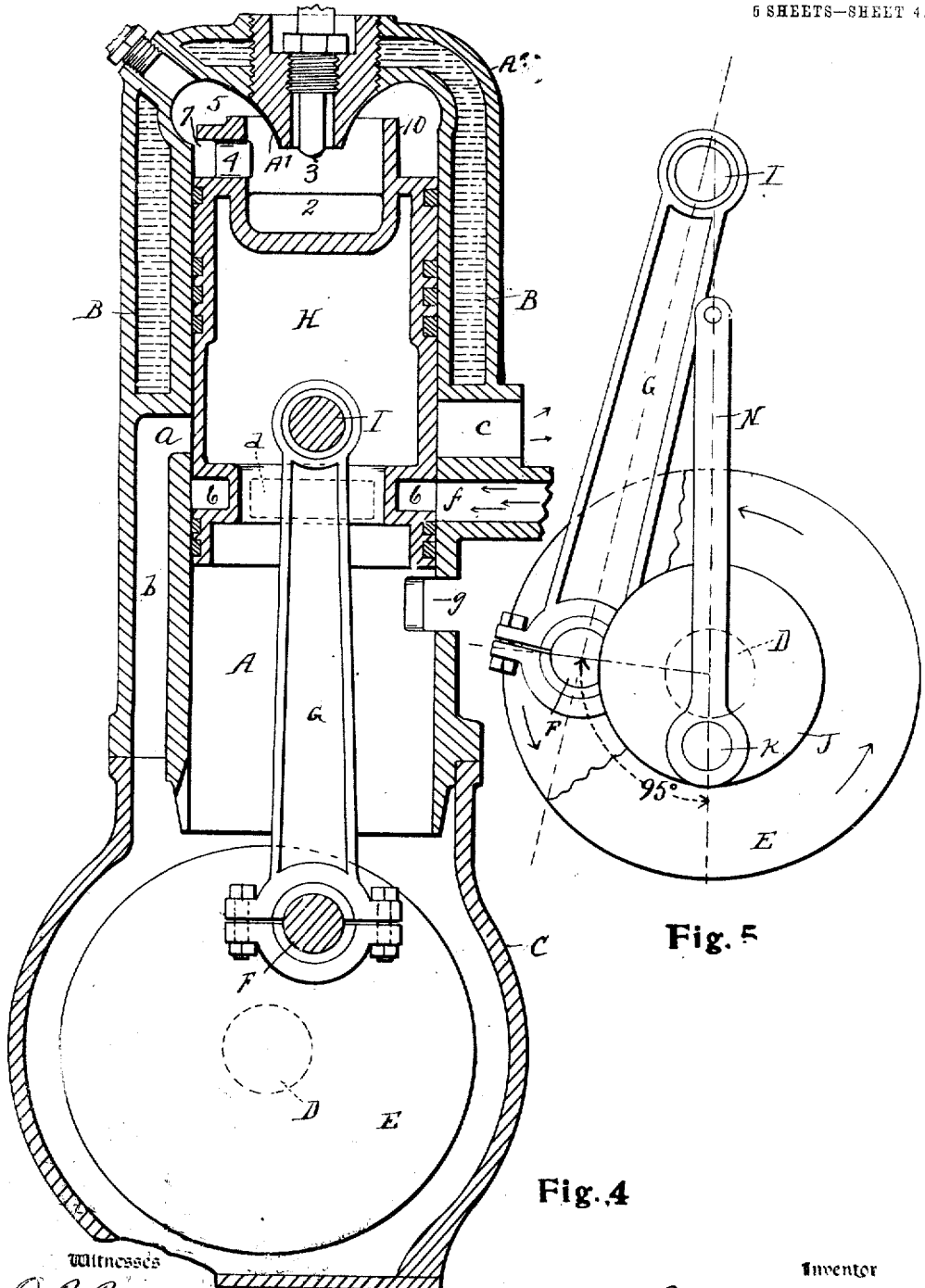

E. C. RICHARD.
INTERNAL COMBUSTION ENGINE.
APPLICATION FILED JAN. 13, 1908.

954,208.

Patented Apr. 5, 1910.
5 SHEETS—SHEET 5.

Witnesses
O. B. Baenziger
N. Belles

Inventor
Eugene C. Richard
By Parker Burton
Attorneys

UNITED STATES PATENT OFFICE.

EUGENE C. RICHARD, OF LANSING, MICHIGAN.

INTERNAL-COMBUSTION ENGINE.

954,208.

Specification of Letters Patent.

Patented Apr. 5, 1910.

Application filed January 13, 1908. Serial No. 410,514.

*To all whom it may concern:*

Be it known that I, EUGENE C. RICHARD, a citizen of the United States, residing at Lansing, county of Ingham, State of Michigan, have invented a certain new and useful Improvement in Internal-Combustion Engines, and declare the following to be a full, clear, and exact description of the same, such as will enable others skilled in the art to which it pertains to make and use the same, reference being had to the accompanying drawings, which form a part of this specification.

My invention relates to internal combustion engines, and the object of my improvements is to provide an improved two-cycle engine.

Figure 1:
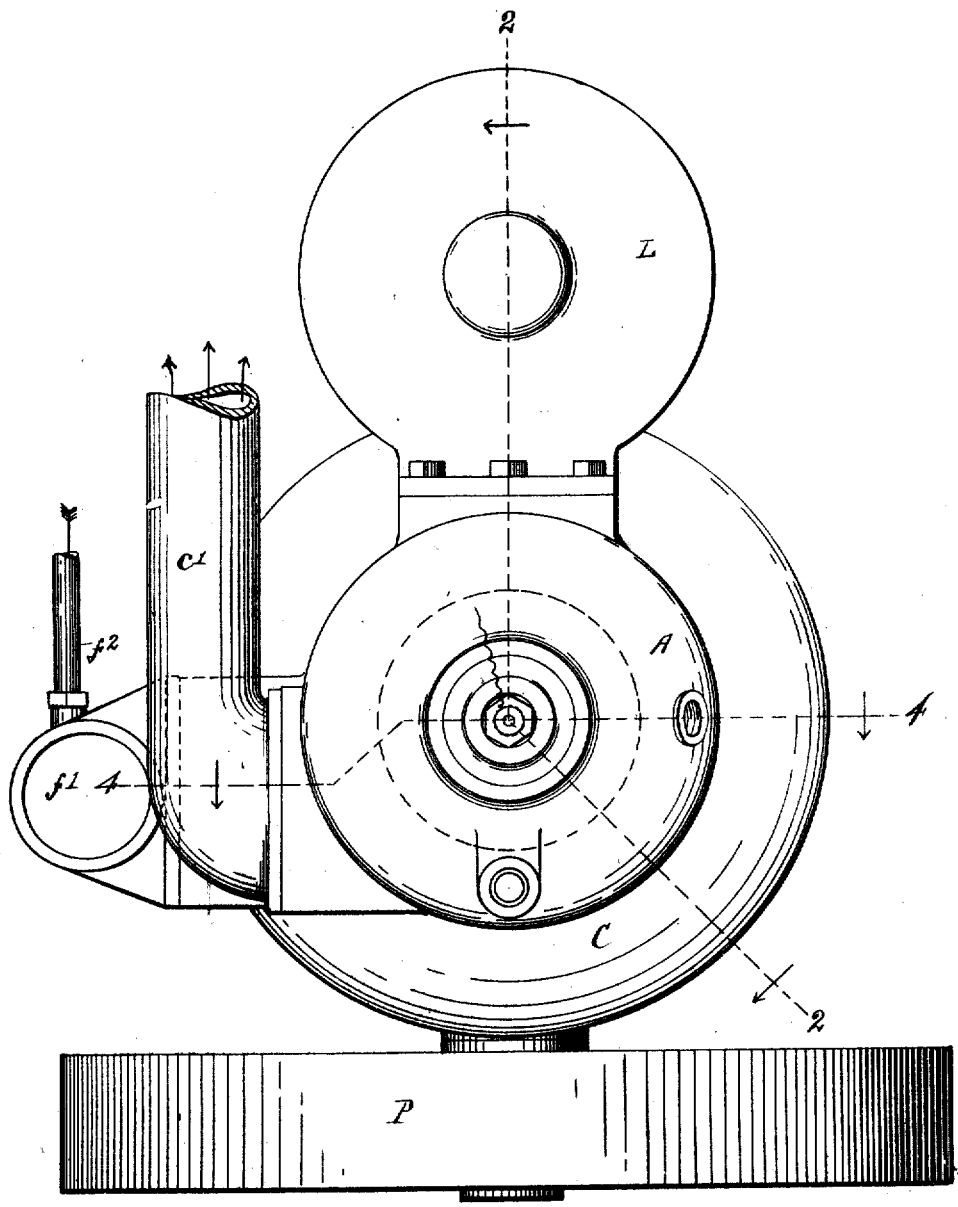
Figure 2:
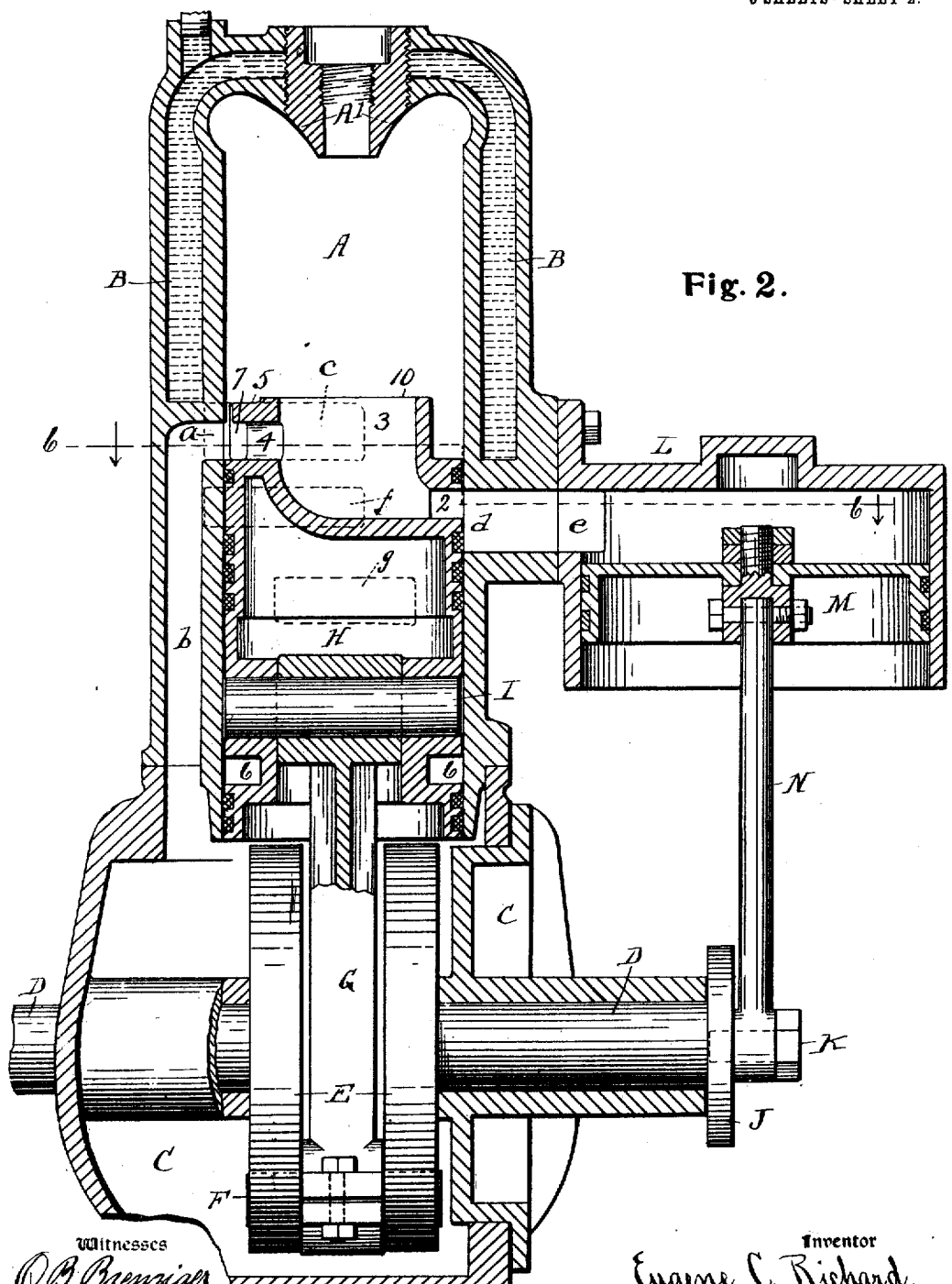
Figure 6:
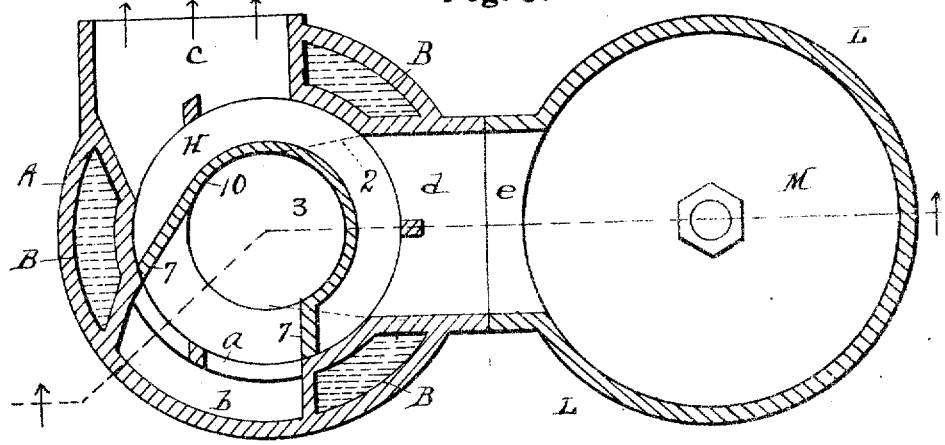
Figure 7:
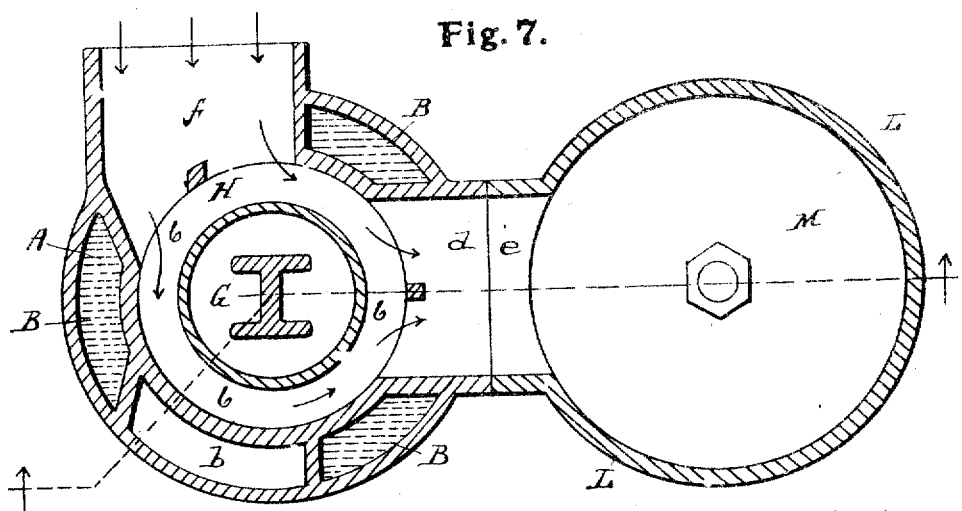

In the accompanying drawings: Figure 1, is a plan view of a gas engine embodying my invention. Fig. 2, is a vertical section of the same principally on the lines 2, 2, Fig. 1, the piston being shown at its lower dead center. Fig. 3, is a section similar to Fig. 2, showing the piston at its upper dead center. Fig. 4, is a vertical section on the plane indicated by the line 4, 4, Fig. 1. Fig. 5, is a diagrammatic view, showing the relative positions of the two crank pins. Fig. 6, is a section on the line 6, 6, Fig. 2. Fig. 7, is a section on the line 7, 7, Fig. 3.

A, is the cylinder, provided with a water-jacket B; C, is the crank case; D, is the main shaft.

E, E, are crank disks upon the shaft D; F, is the crank pin; G, is the connecting rod; H, is the piston; I, is the pin by which the connecting rod G, is pivoted to said piston.

J, is a crank disk on the outer end of a part of the main shaft D; K, is a crank pin on the disk J.

L, is a displacing cylinder; M, is a piston adapted to fit and reciprocate in the cylinder L; N, is a connecting rod joining the crank pin K, to the piston M, in the usual way.

P, is a fly-wheel upon the shaft D.

The cylinder A, is off-set relative to the crank D, as indicated in Fig. 4, and the crank pin K, is placed something more than 90 degrees ahead of the crank pin F.

Through the walls of the cylinder A, are formed the following ports, that is to say: the inlet port *a*, connected with the crank case C, by a passage *b*; the exhaust port *c*, a port *d*, connected through a passage *e*, with the upper end of the displacing cylinder L; a port *f*, connected with a carbureter *f¹* (Fig. 1) and a port *g*, through which atmospheric air is supplied to the crank case at the upper end of the piston stroke.

The piston is provided with the following described apertures and passages: a passage 3, concentric with said piston and opening upward through an annular extension 10, from the top of the piston H, its lower end being closed; a passage 2, extending from the lower end of the passage 3, to the periphery of the piston H; and an aperture 4, extending through the wall of the extension 10, and communicating with the passage 3, above the passage 2. The extension 10, is of less diameter than the piston H, and the bridge 5, above the aperture 4, does not extend out quite to the walls of the cylinder A, and there are partitions 7 in vertical planes extending to the periphery of the piston H, and to the walls of the cylinder A, and serving to form extensions of the side walls of the aperture 4 (Fig. 6). 6, is a passage formed in the lower end of piston H preferably in the shape of an annular groove formed around the periphery of said piston. These passages and apertures and the ports in the cylinder A, have about the relative positions shown in the drawings so as to accomplish the following objects and secure the mode of operation hereinafter described.

When the piston H, is approaching its lower dead center its upper end passes over the exhaust port, *c*, opening an exhaust passage and allowing the pressure to escape from the cylinder A; as the said piston continues to descend the exhaust port, *c*, is opened to a greater extent and the inlet port, *a*, which communicates with the crank case by a passage *b*, is uncovered allowing a scavenger charge of air to be projected from the port *a*, through the aperture, 4, and upward through the passage, 3, to the upper end of the cylinder A, where it is regularly deflected by the form of said cylinder at its upper end, indicated at A¹. As the piston continues still to descend the ports, *a*, and, *c*, are opened to a still greater extent and the port, *d*, is opened by the aperture, 2, registering therewith. When the port, *d*, commences to open the piston, M, is ascending and forces the charge of air and vapor or gas (with which it has been supplied in a manner hereinafter described) through passages, *e*, *d*, and apertures, 2, into the passage, 3, and upward into the cylinder A, forming an explosive mixture in said cylinder. As the piston H, begins to ascend on its return stroke, while the port, a, is still open, a small amount of residual gas is drawn from the cylinder A, above the bridge, 5, and between said bridge and the cylinder wall. The ports, a, c, d, are closed by the piston H, passing over them and the explosive charge is compressed above said piston. Toward the upper end of the stroke of the piston H, the groove, 6, registers with the port, d, and with the port, f, which communicates with a carbureter $f^1$, as indicated in Fig. 4. The carbureter is supplied with liquid fuel by a pipe $f^2$. When the groove, 6, communicates both with the port, d, and the port, f, the piston M, is descending rapidly and draws in a rich charge of carbureted air, or air and gas, which is discharged into the cylinder A, above the piston H toward the end of the power stroke as above described.

The above described engine secures an explosion at every revolution of the crank shaft; the products of combustion are swept out by a scavenger charge of air and an explosive mixture is supplied to the power cylinder under conditions that avoid discharging the fuel at the exhaust port. It is also evident that there is very little or no negative work done by the piston M. On its upstroke said piston begins to discharge the contents of the cylinder L, at atmospheric pressure into the cylinder A, when at about 45 degrees from its lower dead center and communication between the two cylinders is cut off at about 135 degrees. During the remaining 45 degrees of the stroke the remaining contents of the cylinder L, are compressed, but are immediately reëxpanded in the succeeding 45 degrees at which point the cylinder L, is put into communication with the carbureter and this communication remains open for about the succeeding 90 degrees. During the remaining 45 degrees of the stroke the charge in the cylinder L, is slightly expanded but is brought back to atmospheric pressure at the end of the first 45 degrees of the up-stroke when it again discharges its contents into cylinder A, at atmospheric pressure and temperature.

What I claim is:

1. In an internal combustion engine, the combination of a working cylinder, a piston adapted to reciprocate therein, a source of air supply, said cylinder being provided with a port through its wall communicating with said source of air supply and so located that it shall be uncovered by said piston at the end of the working stroke of the same, a second cylinder, a piston therein, a delivery passage between said cylinders always opening to the compression space of said second cylinder and terminating in a second port in the wall of the working cylinder, so located that it shall be uncovered by the working piston at the end of the working stroke, said pistons being so connected that the piston in the second cylinder shall be on its delivery stroke when the working piston uncovers said second port, the arrangement being such that substantially all the contents of said second cylinder shall be delivered at atmospheric pressure through said second port, while the same is open, substantially as described, and means for supplying said second cylinder with gaseous fuel.

2. In an internal combustion engine, the combination of a working cylinder, a piston adapted to reciprocate therein, a source of air supply, said cylinder being provided with a port through its wall communicating with said source of air supply and so located that it shall be uncovered by said piston at the end of the working stroke of the same, a second cylinder, a piston therein, a delivery passage between said cylinders terminating in a second port in the wall of the working cylinder so located that it shall be uncovered by the working piston at the end of the working stroke, said pistons being so connected that the piston in the second cylinder shall be on its delivery stroke when the working piston has uncovered said ports, a third port in said working cylinder communicating with a source of gaseous fuel, the working piston being provided with a passage adapted to connect said second and third ports during the intake stroke of the piston in said second cylinder.

3. The combination of a working cylinder, a piston therein, an annular projection from the top of said piston of less diameter than said cylinder, a port through said cylinder, a passage leading from the interior of said annular projection to the periphery of said piston and adapted to register with said port, a passage through the wall of said annular projection, a second port through said cylinder adapted to be uncovered by said piston, the passage through the wall of said annular projection being so located that it shall come opposite said second port when the latter is uncovered, means for opening an exhaust passage toward the end of the working stroke, means for supplying a scavenging charge to one of said ports and fuel to the other of said ports.

4. The combination of a working cylinder, a piston therein, an annular projection from the top of said piston of less diameter than said cylinder, a port through said cylinder, a passage leading from the interior of said annular projection to the periphery of said piston and adapted to register with said port, a passage through the wall of said annular projection, a second port through said cylinder adapted to be uncovered by said piston, the passage through the wall of said annular projection being so located that it shall come opposite said second port when the latter is uncovered; means for opening an exhaust passage toward the end of the working stroke, means for supplying a scavenging charge to the second of said ports and fuel to the first of said ports, a carbureter, a third port in said working cylinder, a passage communicating with said carbureter and said third port, and a passage at the lower end of said piston adapted to communicate with said first and third ports at the end of the compression stroke of said piston.

5. In an internal combustion engine, the working cylinder A, the supply cylinder L, ports $a$, $f$, $d$, in the walls of said working cylinder, a carbureter connected with the port $f$, a source of scavenging supply connected with the port $a$, said supply cylinder communicating with the port $d$, said piston being adapted to open the ports $a$, $d$, at the end of the working stroke of said piston and to connect the ports $d$, $f$, at the end of the compression stroke of said piston for the purpose described.

6. In an internal combustion engine, a working cylinder A, a supply cylinder L, said cylinders being adjacent and having their axes parallel, ports $a$, $f$, $d$, in the walls of said working cylinder, a carbureter connected with the port $f$, a source of scavenging supply connected with the port $a$, said supply cylinder communicating with the port $d$, said piston being adapted to open the ports $a$, $d$, at the end of the working stroke of said piston and to connect the ports $d$, $f$, at the end of the compression stroke of said piston for the purpose described.

In testimony whereof, I sign this specification in the presence of two witnesses.

EUGENE C. RICHARD.

Witnesses:
W. W. KNAPP,
A. S. BEMUNTT.